Jan. 30, 1945.  G. LAPEYRE  2,368,147
CHAIN TRANSMISSION MORE PARTICULARLY FOR CYCLES
Filed Aug. 5, 1942  3 Sheets-Sheet 1

Inventor
GASTON LAPEYRE

By Alb Holcombe
Attorney.

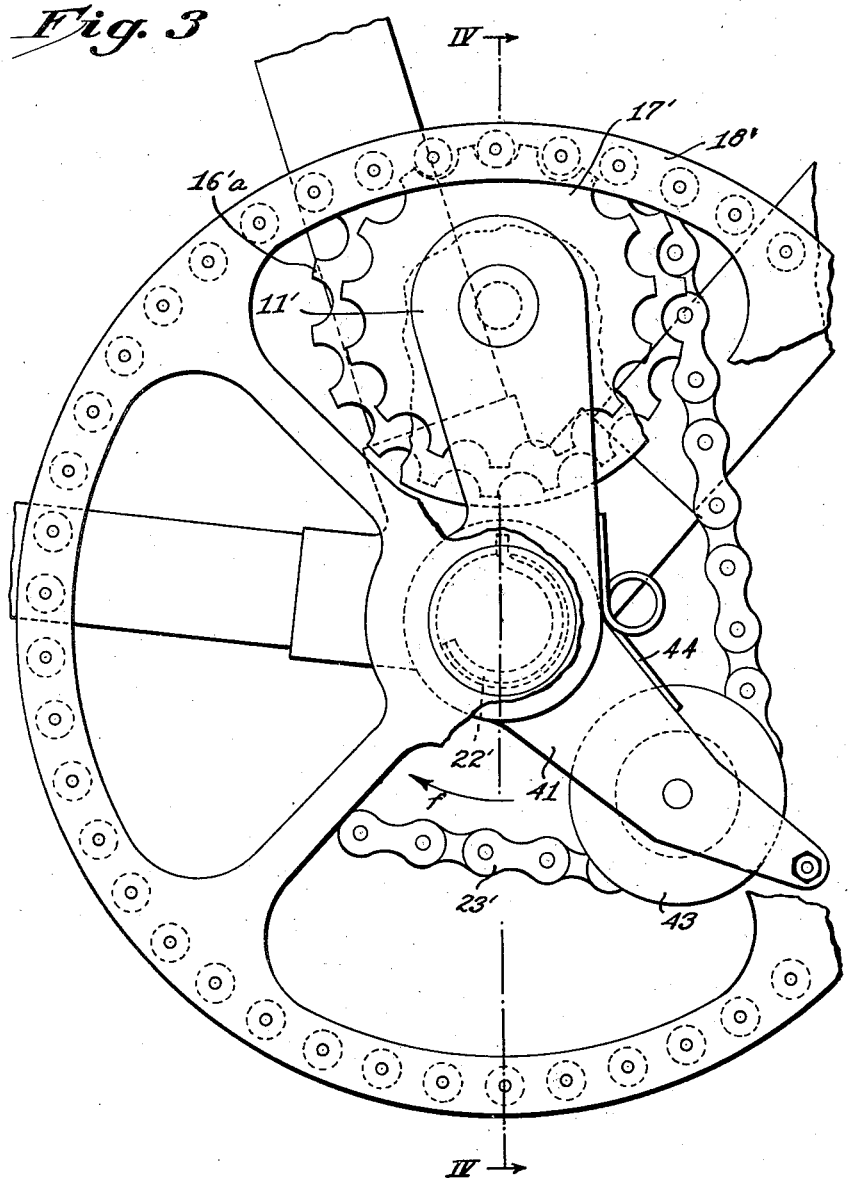

Jan. 30, 1945. G. LAPEYRE 2,368,147
CHAIN TRANSMISSION MORE PARTICULARLY FOR CYCLES
Filed Aug. 5, 1942 3 Sheets-Sheet 3

Inventor
GASTON LAPEYRE
By A. W. Holcombe
Attorney.

Patented Jan. 30, 1945

2,368,147

UNITED STATES PATENT OFFICE 2,368,147

CHAIN TRANSMISSION, MORE PARTICU-
LARLY FOR CYCLES

Gaston Lapeyre, Tarbes, Hautes-Pyrenees, France; vested in the Alien Property Custodian Application August 5, 1942, Serial No. 453,705
In France May 28, 1941

15 Claims. (Cl. 74—217)

My invention relates to improvements in variable speed gears of the kind in which chain transmissions are provided with chain tripping devices. It is known that the gears of this kind have various drawbacks, inter alia: a reduced range of speeds, a rapid wear of the chain on account of its obliquity with respect to the driving and driven sprockets for the end gear ratios, the practical impossibility to shift from one speed to another while the chain is transmitting a substantial effort, frequent falls of the chain and, lastly, in the case of bicycles, complications in dismounting the rear wheel due to said gears.

It is an object of this invention to eliminate the above-mentioned drawbacks by providing a strong light-weight gearing capable of producing numerous speeds.

In accordance with the invention a chain is mounted upon a driving sprocket which sprocket is supported on one end of a rocking arm. The sprocket is rotated about its own axis, through the medium of a preferably multiplicating transmission, and from a rotatable element concentric with the axis of rotation of said rocking arm. Between the source of power and the chain an epicyclic transmission is provided since the driving sprocket of the chain is rotatable both around its own center and around the rocking arm center.

The advantages of such an arrangement are numerous and substantial. On the one hand, tension is automatically produced on the two sides of the chain due to the tendency of the driving sprocket to be rocked about the rocking arm axis; hence the chain will always be correctly stretched and remain so whatever may be the diameter of the driven sprocket in actual use. On the other hand, when shifting the chain from a driven sprocket onto another driven sprocket of different size, the two sides of the chain vary simultaneously and equally in length, whereas in the known systems only the slack side of the chain was varied in length, so that compensating this variation in length, in view of maintaining the chain suitably stretched, was more difficult. Besides, in case of an abnormal resistant stress, as when the chain is being shifted from one sprocket onto another, for example, the rocking arm yields and returns rearwardly while a compensation is obtained at the same time through differential rotation of the driving sprocket. This action permits this shift to be effected while the driving effort is in the course of being expended and regardless of the intensity of said effort. This facility in shifting also permits the use of driven sprockets whose diameters differ much more widely than hitherto usual. As a result, for a given number of driven sprockets, the scale of speeds is much more extensive with the present gear than with the usual gears hitherto used. Besides, due to the presence of the multiplicating transmission the diameter of the driving sprocket of the chain is not very different from those of the driven sprockets, so that the obliquity assumed by the chain when running round the extreme driven sprockets is much less harmful, and the chain is not submitted to an abnormal wearing stress.

A further advantage of this arrangement is that it permits mounting co-axially and side by side several driving sprockets of different diameters adapted to be selectively brought into engagement with the chain. A very extensive scale of speeds is thus obtained, with a number of speeds equal to the product of the numbers of driven and driving sprockets.

Another advantage of this arrangement is that it permits the driving sprocket or group of sprockets to be slidably arranged. The chain may thus be caused to be in alinement with the sprocket in actual use.

Preferably, the said multiplicating transmission consists of a driven sprocket having sprocket teeth meshing internally with a driving lantern wheel concentric with the movable arm.

It is also advantageous, in case this transmission mechanism is provided with a free-wheel device, more particularly when applied to cycles, that the free-wheel mounted sprocket be that driving sprocket which is carried on the rocking arm. This arrangement makes it still easier to shift the chain from one sprocket on to another since it permits such a step to be effected while the machine is coasting; i. e. while the driving sprocket is overrun, the chain being then but slightly stretched by the rocking arm and driven by the driven sprocket owing to inertia.

As examples, to which the invention is in nowise limited, two different embodiments of carrying out the various improvements above mentioned, here shown as applied to a bicycle, are hereafter described with reference to the annexed drawings in which:

Fig. 3 is a similar view to Fig. 1, showing another embodiment applied to a bicycle of the common kind;

In the example of application as shown in

Figure 1:
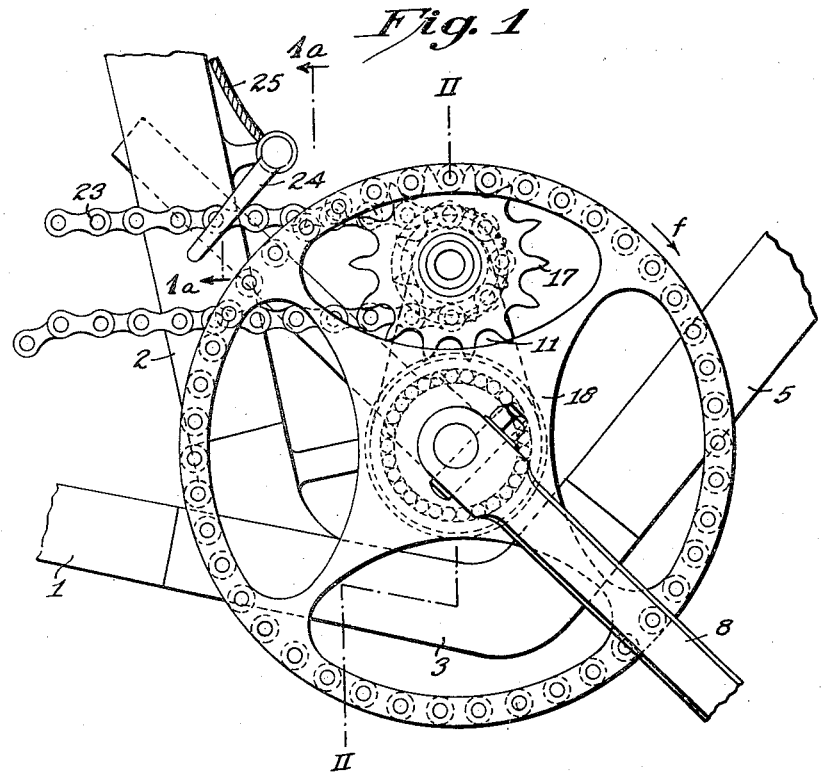
Fig. 1 is an elevational view of the front sprocket wheel of a bicycle specially designed in view of the application of the new gear.
Figure 2:
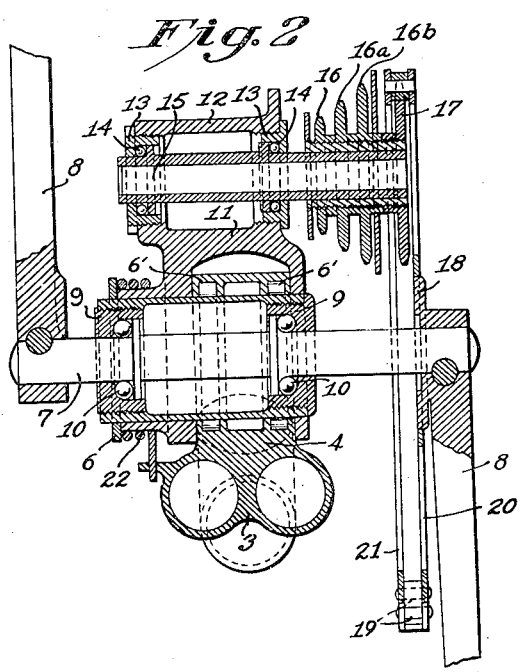
Fig. 2 is a cross section on the line II—II of Fig. 1.

Figs. 1 and 2, the usual frame of the bicycle is slightly altered at the crank bracket, inasmuch as the chain stays 1 are provided forwardly of the seat tube 2 with a short extension 3 carrying an upwardly extending lug 4. From the front end of said extension 3 extends the bottom tube 5 of the frame. The lug 4 of the bicycle is provided with a transverse cylindrical bore through which extends a cylindrical cage 6 supported on two sets of rolls 6' arranged in said lug 4. The spindle 7 of the pedal cranks 8 is mounted in the usual manner in said cage 6 by means of threaded cups 9 and balls 10. The ends of said cage which protrude on both sides of the lug 4 carry a forked arm 11, the limbs of which engage the finished side faces of said lug. Said arm 11 extends upwardly above the spindle 7 and has a perforated lug 12 integral with the upper end thereof, the longitudinal axis of the perforation being parallel with that of the cage 6. A spindle 15 is supported in perforated lug 12 by means of screwed cups 13 and balls 14. On one side, the spindle is provided with a rather long extension protruding from the lug 12; and on the same side of lug 12, the crank spindle 7 protrudes also substantially out of the cage 6. On the protruding part of the spindle 15 are secured a set of three sprockets 16, 16a, 16b arranged side by side and of different sizes and, at the end of said spindle a fourth sprocket 17, meshing internally with a lantern sprocket wheel 18 whose trundles consist of rollers 19, which rollers are similar to those of chains and held between a rigid perforated plate 20, integrally connected with one of the cranks 8 and a counter-plate 21 consisting of a plain rigid ring. The sprocket 17 is provided with teeth similar to those of a usual chain sprocket, so that the meshing action between said sprocket and the special sprocket wheel 18, which is substituted for the usual bicycle front sprocket wheel, is exactly similar to that between a sprocket and a chain. A light torsion spring 22 is coiled round the cage 6, the ends of said spring being hooked upon the arm 11 and the chain stay extension 3, respectively, so as to exert upon said arm a force tending to rotate the same in the direction of the arrow f, i. e. forwardly.

Figure 1A:
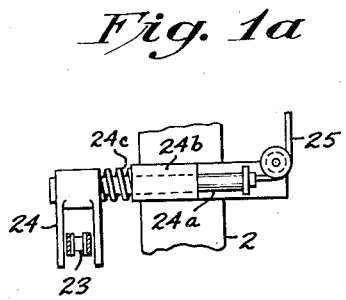
Fig. 1A is a sectional view taken along line 1A—1A of Fig. 1.

A usual chain 23 runs round one of the sprockets 16, 16a, 16b and one of the sprockets, not shown, of the rear wheel. The tripping of the chain when the latter is to be shifted from one sprocket of the rear wheel on to another is controlled by any one of the usual shifting devices, the fork of which engages with the driven side of the chain and is adapted to be transversely moved from a removed control member, through the medium of a suitable transmission, preferably a cable transmission. Another control device of this kind is provided, in the present instance, to control the shifting of the chain from one of the driving sprockets 16, 16a, 16b on to another. This device comprises a fork 24, which is slidably mounted on the seat tube 2 and engages with the driving side of the chain at a position close to the rocking arm 11. Said fork 24 is adapted to be shifted transversely through the medium of a cable 25. Fig. 1A is a detail view of the transversely shifting fork. Any of several conventional forms of belt shifts may be employed. For example, fork 24 may be mounted upon a shaft 24a slidably mounted for transverse movement in lug 24b. A spring 24c may be employed to urge the fork in one direction and the cable 25 to urge the fork in the other.

The operation of this mechanism is as follows:

When the wheel 18 rotates it tends to cause the rocking arm 11 to move in the same direction, this tendency being however counteracted due to the engagement of the chain 23 with one of the sprockets 16, 16a, 16b. The sprocket 17 is consequently caused to rotate around its own center and carries with it the spindle 15, the set of sprockets 16, 16a, 16b and the chain 23. To the tension exerted on the driving side of the chain by the transmitted force, will be added an additional tension produced by the force tending to rotate the arm 11, and since this additional tension acts also on the driven side, any sagging of the latter is avoided. When stopping, the spring 22 counterbalances the force exerted on the arm 11 due to the weight of the chain, the latter being thus maintained slightly stretched.

In order to change speed, as for example by causing the chain to be shifted from the driving sprocket 16 onto the nearest sprocket of larger size 16a, thus obtaining a higher gear, the chain must be shifted crosswise by means of the fork 24 operated through the cable 25; the chain begins to grip the sprocket 16a and, on account of the peripheral speed of said sprocket being higher than that of the chain, which continues to be driven from the sprocket 16, the arm 11 is rocked rearwardly. During this rocking motion, the driving side of the chain remains stretched and continues to transmit the driving force, while the driven side and that portion of the chain which is still coiled round the sprockets 16 are slackened, thus avoiding any abnormal tension of the chain and securing a very smooth shifting of the chain from the sprocket 16 onto the sprocket 16a. Shifting of the chain from the sprocket 16a onto the sprocket 16b of larger size is similarly effected. As soon as the chain has been transferred from one sprocket to another, its two sides are again tensioned by the arm 11, which tends to be returned forwardly until a position of equilibrium is reached when the tension of the chain is equal to the driving force exerted on said arm 11.

In order to shift the chain from a driven sprocket to another driven sprocket of larger size, the driven side of the chain is acted upon by means of a simple fork so as to be shifted transversely; the excess tension which tends to be applied to this side, due to said shifting step and to said side beginning to be driven by the new sprocket of larger size, causes the arm 11 to be returned rearwardly, while the driving side remains stretched and continues to transmit the force, due to a compensating differential rotation of the driving sprocket. The amount of excess tension is consequently always very small. The chain is then shifted in the same manner as in the case of the usual gears of this kind, any abnormal tension of the driving side being however avoided since it would immediately cause a greater rocking of the arm 11 rearwardly and hence, an immediate slackening of the tensioned driving side. As soon as the chain has finally been lapped on to its new sprocket, the arm 11 slightly rocks forwardly to a position of static equilibrium.

Likewise, when shifting the chain from a driving or driven sprocket to another of smaller size, any excess tension of one of the sides of the chain causes immediately a rearwardly rocking of the arm 11, so that said excess tension is limited to a very small amount.

It follows in all cases that the chain is shifted from one sprocket to another with much suppleness and smoothness without stressing or danger of breaking the chain or the sprocket, even when a full driving effort is effected.

It will be noted that the rocking arm is so arranged that its own weight tends naturally to cause the same to rotate in the direction of the arrow f, thus producing a tension on the chain.

Figure 4A:
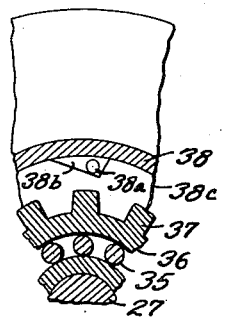
Fig. 4A is a sectional detail view taken along line 4A—4A in Fig. 4.
Figure 4:
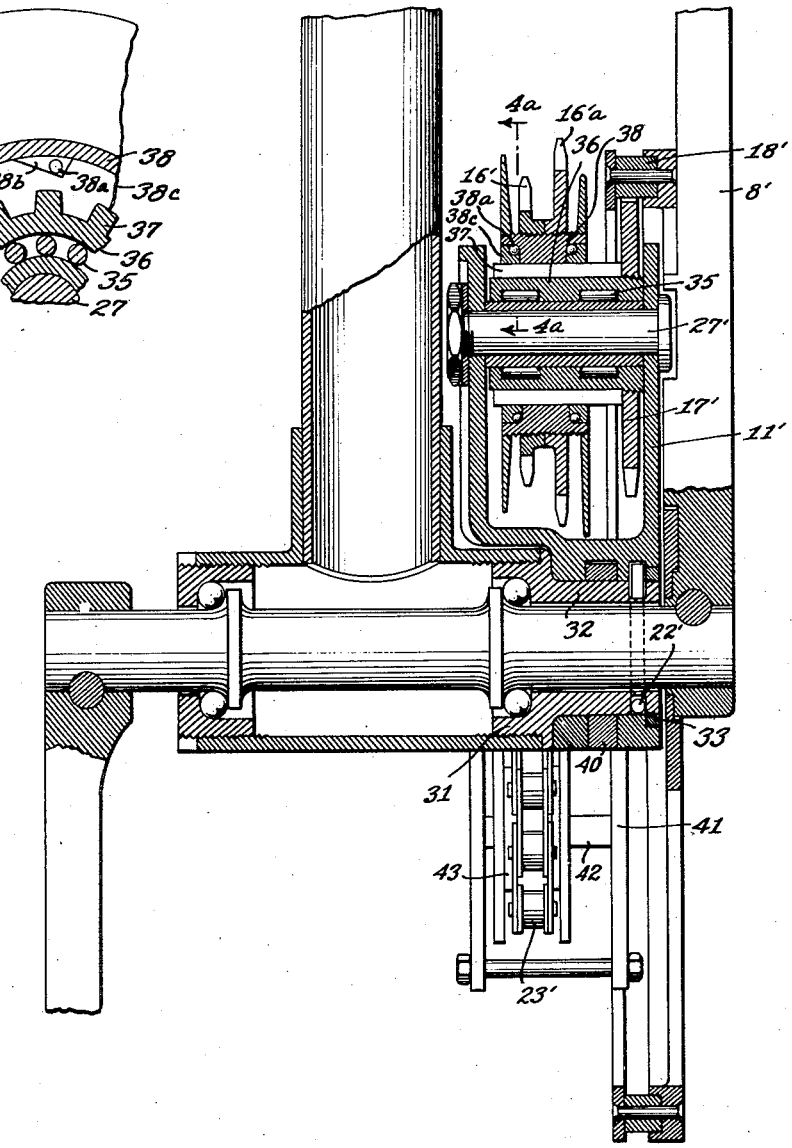
Fig. 4 is a cross section on the line IV—IV of Fig. 3.

In the alternative embodiment shown in Figs. 3 and 4, the cup 31 of the sprocket wheel is provided externally with a co-axial cylindrical bearing surface 32 on which is freely and rotatably fitted the hub of a forked rocking arm 11', said arm being retained axially by means of a nut 33 screwed on the threaded end of said bearing surface 32. To the limbs of this forked arm 11' is secured a spindle 27' on which is tightly fitted a needle bearing 35, the outer race sleeve 36 of which is provided with longitudinal splines 37. On the latter is slidably fitted the correspondingly splined hub 38c of a free-wheel device 38. On the outer crown of the device two sprockets 16', 16'a are secured which correspond to the sprockets 16 and 16a of the previously described arrangement. As in Fig. 2 a sprocket 17' meshes with a lantern wheel 18' secured to the cranks 8'; however, in the present case, said sprocket 17' is fastened to the outer race sleeve 36 of the needle bearing 35, so that the free-wheel device 38 is inserted between said sprocket 17' and the group of sprockets 16', 16'a. (See Fig. 4A.) The free wheel device therefore resembles the conventional overrunning clutch wherein ball 38a is positioned in a cam slot 38b so as to permit rotation of member 38 when member 36 is held stationary, and to clutch members 36 and 38 together when member 36 is rotated at the same speed and direction as member 38. A spring 22', housed in a groove of the cup 31 and whose ends are respectively hooked in holes provided transversely of the axis in the cup and the hub of the arm 11', tends to rotate the latter in the direction of the arrow f. Said hub consists of two cheeks spaced from each other. On the bearing surface 32 is also freely mounted to rock between said cheeks an arm 40 which terminates in a fork 41 supporting a spindle 42 on which a roll 43 to guide the chain 23' is adapted to slide. On the arms 11' and 40 are hooked the ends of a spring 44 which is connected between said arms so as to tend to move the same away from each other. Moreover said arm 40 is so arranged that the tension of the chain on the guide roll 43 gives a resultant force, the moment of which with respect to the sprocket wheel axis, tends to cause the arm 40 to rock towards the rocking arm 11' against the action of the spring 44 and thus to reduce the length of that portion of the chain passing around said roll 43. The position of the chain is controlled, as in Figs. 1 and 2, by means of a movable fork, not shown.

It will be observed that in this embodiment, the path of the chain is partly above and partly underneath the sprocket wheel spindle, as in the usual gears, in contradistinction to the embodiment of Figs. 1 and 2, in which the two sides of the chain are on the same side, i. e. the upper side of the sprocket wheel spindle.

Owing to the fact that the free-wheel device is mounted on the rocking arm instead of being mounted on the sprocket wheel, it is obvious that the chain runs constantly with said sprocket wheel, and it is thus possible to shift the chain from one sprocket on to another without pedalling being necessary.

On the other hand, as in the previously described arrangement, the tension on the two sides of the chain is ensured by the rocking arm 11', the purpose of the guide roll 43 being not to tension the driven side of the chain, but to remove said side from the sprocket wheel. The moment of the resultant force of the tension of said driven side on the roll 43 with respect to the sprocket wheel axis is counterbalanced by the spring 44. As the chain is tripped in order to cause the same to rise from one of the rolling sprockets carried by the rocking arm on to another, the gear operates in the same manner as described above with respect to Figs. 1 and 2; i. e. the arm 11' rocks rearwardly under the momentaneous excess tension to which the chain side beginning to roll itself on said new sprocket is submitted. As the chain is tripped to cause the same to rise from one of the other rolling sprockets at the opposed end of the chain on to another, the excess tension on the chain side beginning to roll itself on this sprocket does not cause any tendency of the arm 11' to rock rearwardly, but causes the arm 40 to rock against the action of the spring 44, thus reducing the length of the path which said chain side is compelled to follow and facilitating the lapping motion of said side on to the new sprocket.

This embodiment has more particularly the advantage of permitting the easy conversion of an already built machine, since all that is needed for this purpose is to substitute the cup 31 for the usual cup of the sprocket wheel, a crank spindle of increased length for the usual crank spindle, and a lantern wheel for the usual large sprocket wheel, whereas the embodiment shown in Figs. 1 and 2 necessitates a conversion of the frame.

Obviously, the invention is in nowise limited to the details of construction shown or described, as the same are only given as an example. Thus, in particular, any number of driving or driven sprockets may be provided; for example, the gear may be equipped with only one driven sprocket and several driving sprockets, or with only one driving sprocket and several driven sprockets. In like manner, the driving sprockets may be shiftable or non shiftable, whatever may be otherwise the embodiment chosen.

It will also be noted that the mounting of the free-wheel device on the rocking arm applies equally well to the embodiment of Figs. 1 and 2 as well as to that of Figs. 3 and 4. The same may be said of the mounting of a splined spindle of the chain rolling sprocket or sprockets carried by the rocking arm. The mounting of the rocking arm on a cup of the sprocket wheel may also be used with the two sides of the chain arranged to pass on the same side of the sprocket wheel axis; if said axis is located between the two sides of the chain, the arm carrying the chain guide roll may be eccentrically jointed to said rocking arm instead of concentrically as described above.

What I claim is:

1. A chain transmission comprising a rotatably mounted rocking arm, a driving sprocket rotatably secured upon said rocking arm, a chain passing round said sprocket and means for rotating said driving sprocket about its own axis, said means including a rotatable member concentric with the axis of rotation of said rocking arm, and motion transmitting means from said rotatable member to said driving sprocket.

2. A chain transmission as in claim 1, wherein said rotatable member is a lantern wheel and said motion transmitting means includes a pinion provided with chain sprocket teeth in mesh with said lantern wheel.

3. A chain transmission as in claim 1, wherein said rotatable member is a lantern wheel and said motion transmitting means includes a pinion arranged coaxially to said driving sprocket, drivingly connected thereto and provided with chain sprocket teeth in mesh with said lantern wheel.

4. A chain transmission comprising a driven sprocket, a rocking arm, a plurality of coaxially and side by side arranged driving sprockets of different diameters rotatably secured to said rocking arm and connected together to rotate as one, a chain passing around said driven sprocket and one of said driving sprockets, means to transversely displace and thereby shift said chain from one driving sprocket to a next one and means for rotating said driving sprockets about their own axis, said means including a rotatable member concentric with said rocking arm and motion transmitting means from said rotatable member to said driving sprockets.

5. A chain transmission comprising a rotatably mounted rocking arm, a plurality of coaxially and side by side arranged driving sprockets of different diameters, rotatably secured upon said rocking arm said driving sprockets being connected together to rotate as one, a chain passing around one of said driving sprockets and means for rotating said driving sprockets about their own axis, said means including a rotatable member concentric with the axis of rotation of said rocking arm, and motion transmitting means from said rotatable member to said driving sprockets.

6. A chain transmission as in claim 5, wherein said driving sprockets are shiftable transversely of the chain.

7. A chain transmission as in claim 1, further comprising a slight spring urging said arm to rock so as to move said driving sprocket away from the driven sprocket.

8. A chain transmission comprising a plurality of coaxially and side by side driving sprockets of different diameters connected together to rotate as one, a rotatably mounted rocking arm for supporting said sprockets, a chain passing around one of said driving sprockets, means to transversely displace and thereby shift said chain from one of said driving sprockets to an adjacent sprocket, and means for rotating said sprockets about their own axis, said means including a rotatable member concentric with the axis of rotation of said rocking arm and motion transmitting means from said rotatable member to said driving sprockets.

9. A chain transmission as in claim 1, wherein the two sides of the chain run on the same side of the rocking arm axis.

10. In a cycle provided with a chain transmission actuatable by pedals, a frame, a rocking arm rotatably mounted on said frame, a driving sprocket rotatably secured upon said rocking arm, a chain passing round said sprocket and means for rotating said driving sprocket about its own axis, said means including a rotatable member concentric with the axis of rotation of said rocking arm and connected to said pedals to be rotated by the latter, and motion transmitting means from said rotatable member to said driving sprocket.

11. In a cycle as in claim 10, said frame being provided with an upwardly projecting bracket provided with a transverse bore, a cage or bushing rotatably fitted within said bore and projecting on each side of said bracket, said rocking arm being provided with transversely bored cheeks embracing laterally said bracket, the projecting parts of said cage being rotatably fitted in the bores of said cheeks, a spindle journaled within said cage and protruding from the latter on each side thereof, and cranks secured on said spindle and carrying said pedals.

12. In a cycle as in claim 10, cranks carrying said pedals, ball-bearing means carried by said frame, a spindle journaled in said ball-bearing means and on which said cranks are secured, said ball-bearing means including a cup shaped member externally provided with a trunnion coaxial to said spindle and located between the frame and the crank and on which is rotatably fitted said rocking arm.

13. In a cycle as in claim 10, cranks carrying said pedals, ball-bearing means carried by said frame, a spindle journaled in said ball-bearing means and on which said cranks are secured, said ball-bearing means including a cup shaped member externally provided with a trunnion coaxial to said spindle and located between the frame and the crank and on which is rotatably fitted said rocking arm, the driven side of the chain passing around the axis of the rocking arm, and means for conveniently guiding said driven side of the chain, said means including a guiding arm rockable about the same axis as the rocking arm.

14. In a cycle as in claim 10, cranks carrying said pedals, ball-bearing means carried by said frame, a spindle journaled in said ball-bearing means and on which said cranks are secured, said ball bearing means including a cup shaped member externally provided with a trunnion coaxial to said spindle and located between the frame and the crank and on which is rotatably fitted said rocking arm, the driven side of the chain passing round the axis of the rocking arm, and means for conveniently guiding said driven side of the chain, said means including a guiding arm rockable about the same axis as the rocking arm but separate thereof, and resilient means interposed between said guiding and rocking arms and urging them to rotate in opposite directions.

15. In a cycle as in claim 10, cranks carrying said pedals, ball-bearing means carried by said frame, a spindle journaled in said ball-bearing means and on which said cranks are secured, said ball-bearing means including a cup shaped member externally provided with a trunnion coaxial to said spindle and located between the frame and the crank and on which is rotatably fitted said rocking arm, the driven side of the chain passing round the axis of the rocking arm, and resilient means for conveniently guiding said driven chain side.

GASTON LAPEYRE.